United States Patent
Aguinet et al.

[15] 3,658,472

[45] Apr. 25, 1972

[54] MANUFACTURE OF NITRIC ACID

[72] Inventors: Gerard Aguinet, Meudon; Jean Manoury, Ville D'Avray; Edouard Martin, St. Cloud, all of France

[73] Assignee: Societe Anonyme: Ugine Kuhlmann, Paris, France

[22] Filed: June 30, 1969

[21] Appl. No.: 837,419

[30] Foreign Application Priority Data

July 1, 1968  France......................................157424

[52] U.S. Cl..................................................23/160, 23/162
[51] Int. Cl. .........................................................C01b 21/40
[58] Field of Search............................................23/160, 162

[56] References Cited

UNITED STATES PATENTS

| | | | |
|---|---|---|---|
| 1,692,298 | 11/1928 | Greathouse..............................| 23/160 |
| 2,028,402 | 1/1936 | Lüscher..................................| 23/160 |
| 2,128,527 | 8/1938 | Fischer...................................| 23/160 |
| 3,116,972 | 1/1964 | Bevevino et al. ........................| 23/174 |

FOREIGN PATENTS OR APPLICATIONS

| | | | |
|---|---|---|---|
| 289,412 | 9/1929 | Great Britain...........................| 23/160 |
| 569,687 | 6/1945 | Great Britain...........................| 23/160 |

*Primary Examiner*—Oscar R. Vertiz
*Assistant Examiner*—G. O. Peters
*Attorney*—Hammond & Littell

[57] ABSTRACT

In the manufacture of nitric acid having a relatively high concentration by catalytic oxidation of ammonia followed by oxidation of the nitrous vapors so obtained and absorption of the oxidized vapors by a solution of nitric acid of relatively low concentration, the nitrous vapors obtained directly from the catalytic combustion of ammonia are intimately contacted with nitric acid at low concentration, whereafter the resulting vapors, which contain less nitrous gas, are contacted with the resulting acid of higher concentration, and so on until nitric acid of the desired concentration is obtained, the successive vapors with a progressively decreasing nitrous gas content being left to pause in an oxidation space between each contacting operation.

2 Claims, 2 Drawing Figures

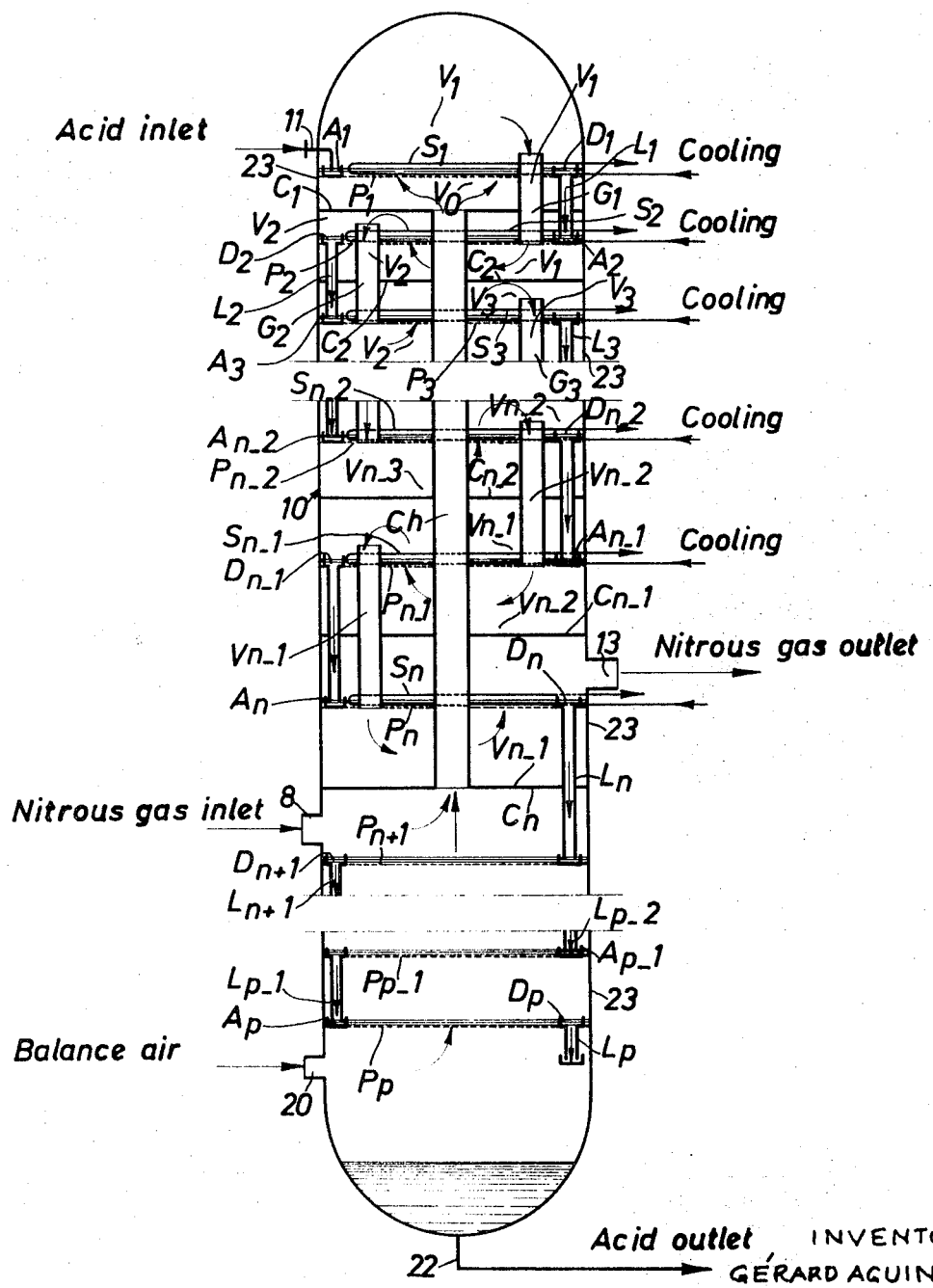

MANUFACTURE OF NITRIC ACID

This invention relates to the manufacture of nitric acid through catalytic oxidation of ammonia.

It is known that this type of method comprises the catalytic oxidation of ammonia by passing a mixture of liquid ammonia and excess air over a catalyst to carry out the reaction:

I. $4NH_3 + 5O_2 \longrightarrow 4 NO + 6 H_2O$ which is followed by oxidation of the obtained nitrogen oxide by oxygen from the excess air, with simultaneous separation of the major portion of the water produced by the reaction, after which the nitrogen peroxide is absorbed by a stream of water or nitric acid at low concentration in the presence of an additional amount of oxygen from the excess air which accompanies the resulting gases. The successive reactions may be written as follows:

II. $2NO + O_2 \rightleftharpoons 2NO_2 \rightleftharpoons N_2O_4$

III. $6NO_2$ (or $3 N_2O_4$) $+ 2 H_2O \rightleftharpoons 4 HNO_3 + 2 NO$

Gases obtained from reaction I, which are often called nitrous vapors, are characterized by their high temperature (800° to 900° C), high water content (about 17 percent), and the presence of NO alone.

The carrying out under good conditions of the absorption according to reaction III imposes a high level of oxidation of NO into $NO_2$ according to reaction II. Furthermore, the treated gases should be cold and dry.

Therefore, in all processes for the commercial production of nitric acid, cooling and drying steps, as well as oxidation (reaction II) are carried out between reaction I (oxidation of ammonia) and reaction II (absorption). Each of the reactions and intermediary steps is carried out in one or more stages, sometimes concomitantly, but it is necessary to provide connection and control apparatus etc. between the apparatus in which the said various steps are carried out, which makes the unit very costly.

Furthermore, in the majority of cases, the three reactions I, II and III are accompanied by a certain absorption of nitrous vapors by the water present, which results in the incidental production of nitric acid at low concentration, which is of no real practical interest and, more important, in the nitrous products in the gases being diluted, which complicates absorption and often makes it necessary to carry out an intermediate compression of the vapors, in addition to the initial compression of air and ammonia before the catalytic oxidation of the latter, to compensate this dilution which is prejudicial to the production of an acid of commercial concentration.

Apart from the fact that this further compression requires energy, the compressor used for carrying out the said compression has to be made of stainless steel and be accompanied by an exchanger and cooling assembly, which is also costly equipment.

Generally speaking, it is found that, in the majority of cases, the various steps of cooling, drying, oxidation and absorption of nitrous vapors are carried out by successive approximations.

Therefore, the problem arises as to how, in practice, to carry out all or part of the said four steps to their conclusion jointly in a single apparatus, which is theoretically possible if operating conditions are created at each point of the said apparatus which permit the kinetics of the various reactions to be harmonized.

The study of this problem shows that, theoretically, there are an infinite number of possible solutions to achieve the result, starting from a given initial state to end at a final, pre-imposed, state.

A simple, well known example is the process disclosed in French Pat. No. 1,462,740 in which a condensor operating with a counter-current acid is used which, if certain conditions are maintained, permits nitrous vapors to be cooled, dried and oxidized practically without absorption of nitrous products, the absorption then being carried out in a separate apparatus.

In all the processes used up to now, the contact between nitrous vapors and liquids (water or nitric acid) is achieved by counter-current or "methodic" circulation.

Contrary to this usual practice, the main object of the present invention is to provide a method for treating nitrous vapors obtained from the catalytic combustion of ammonia with a view to producing nitric acid, in which this circulation is carried out concurrently or "antimethodically," and which permits the four operations of cooling, drying, oxidation and absorption of said vapors to be carried out jointly in a single apparatus.

The method according to the invention consists essentially in contacting the nitrous vapors obtained directly from the catalytic combustion of ammonia with a nitric acid at low concentration, by bubbling said vapors through the said acid with concomitant cooling of the latter, whereby vapors weak in nitrous gases and an acid of higher concentration are obtained, and after a pause in an oxidation zone, again contacting said weakened vapors with the said acid of higher concentration by bubbling and cooling, and so on, until an acid of the desired concentration is obtained.

The lengths of time the product remains in the oxidation zones are calculated to correspond respectively with the necessary oxidation levels between each contact step, taking into account the temperatures, pressures of nitrous vapors and the concentration of the acid at the considered point, according to the details given hereinafter.

In order to carry out the process according to the invention, it is possible, for instance, to use a plate column in which nitrous vapors obtained directly from the combustion of ammonia are caused to arrive under the top plate, and pass through the said plate, in any known manner, to bubble through a layer of nitric acid at low concentration formed on or fed to the said plate from, for example, the scrubber in which the vapors leaving the column after treatment are stripped of the nitrated products contained therein. By means of a set of vertical chimneys and of partitions between the plates, the column is equipped so that the acid from the top plate flows onto the plate immediately below and the vapors which have passed through the top plate are sent underneath the plate immediately below, and so on. Each plate is provided with cooling means, such as a coil through which flows a cooling fluid such as water, ammonia or brine. The "height between successive plates" constituted by the sum of the geometric height between a plate and the sealed partition above it, and of the geometric height between the plate which lies immediately below and the sealed partition below the latter plate, determines the volume of the oxidation zones and, consequently, the period of time during which the nitrous vapors remain in each of the said zones.

The pressure at which the operation is carried out is theoretically arbitrary and can be from 14.7 to 75 p.s.i. for instance. However, for practical reasons, it is preferable to operate at between about 60 and about 120 p.s.i. In fact, calculations show that the lower the pressure the longer the total time the gases have to remain in the apparatus and the greater the volume of said apparatus, which is consequently more expensive. It is, therefore, advisable not to go below a certain pressure, and the value of 60 p.s.i. constitutes a reasonable lower limit.

On the other hand, all else being equal, the temperature of the first plate increases with the pressure for a given rate of condensation. More particularly, this temperature is higher than 115° C. above 75 p.s.i., as is seen in table A hereinbelow, which gives the maximum temperatures of the first plate for pressures of 59 to 147 p.s.i., the strength of the acid on the said plate being about 40% $HNO_3$, the condensation rate being infinitely small.

TABLE A

| Pressure, p.s.i. | 59 | 73.5 | 88 | 103 | 117.5 | 132 | 147 |
|---|---|---|---|---|---|---|---|
| Temperature 1st plate (° C.) | 95.1 | 101.2 | 106.5 | 111.0 | 115.0 | 118 | 122.1 |

Now, in the present state of the technique, metallurgists consider that it is not possible to work at temperatures higher than 115° to 120° C without running the risk of corroding normal stainless steel in the presence of nitric acid. Above 120 p.s.i. it would, therefore, be necessary to use steels specially made to resist corrosion, which would increase the cost of the unit.

The invention is described in greater detail hereinafter, with reference to the appended drawings in which:

FIG. 2 is a diagrammatic vertical cross-section of a plate column for condensation and absorption of nitrous vapors according to the invention.

Figure 1:
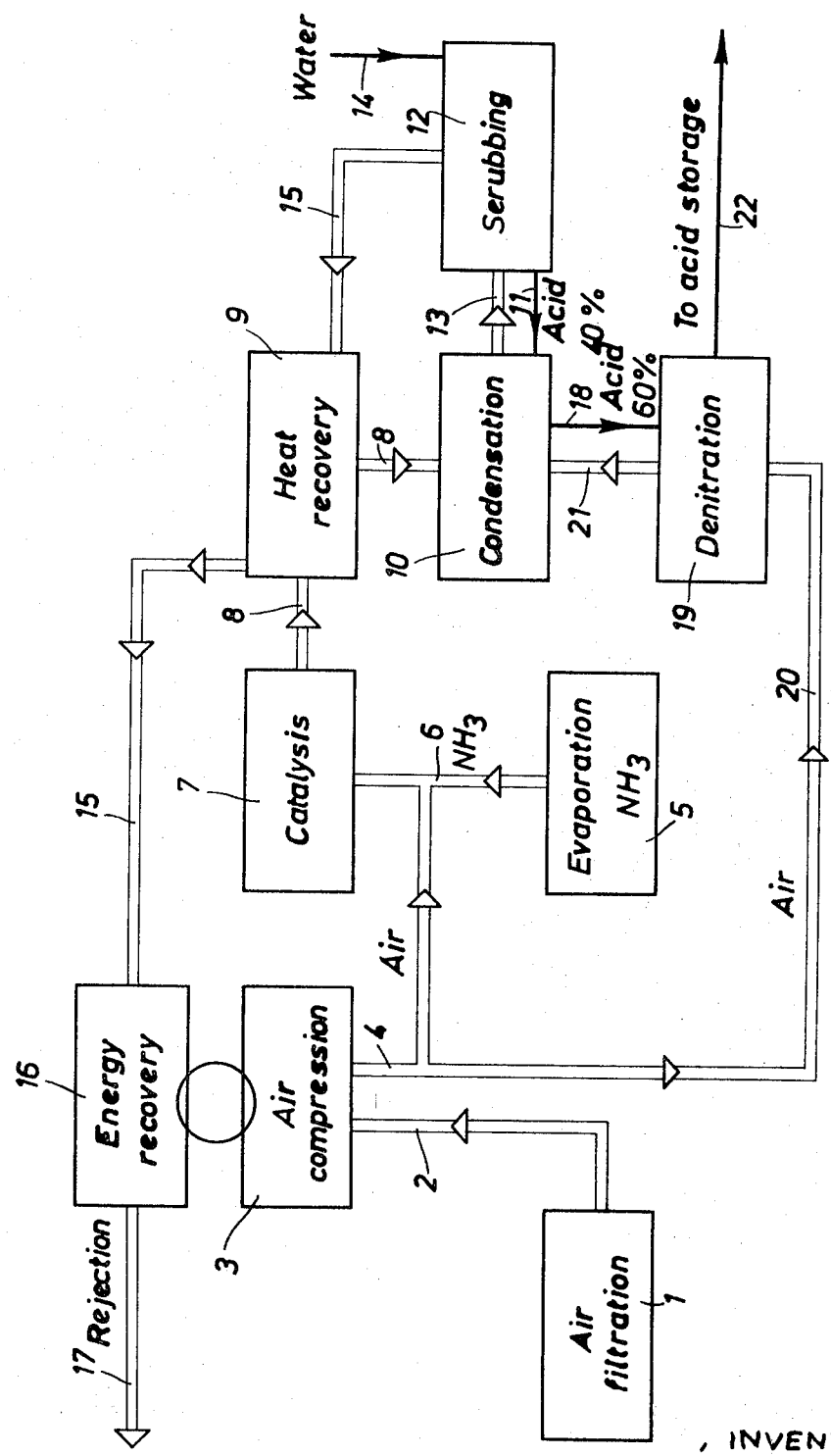
FIG. 1 is a general diagram of an installation for producing nitric acid according to the invention.

According to the diagram of FIG. 1, in which a double line represents the circulation of gases or vapors, and a single line the circulation of liquids, air, filtered in filter apparatus 1, is fed through pipe 2 to a compressor 3 which forces it through pipe 4 which conveys it, at the same time as ammonia obtained from an evaporator 5 through pipe 6, into a catalytic combustion reactor 7 of known type, where the mixture of air and ammonia is converted according to reaction (I) hereinabove. At the outlet of reactor 7, the mixture of NO, water and excess air which tends immediately to convert into $NO_2$ a small amount of the NO contained in said mixture according to reaction (II) hereinabove, is passed by pipe 8, through a heat-exchanger 9, to the condensation and absorption column 10 which will be described hereinafter. Nitric acid at about 40% $HNO_3$ can be fed to column 10 by pipe 11, from a scrubber 12 for instance, into which are sent, through pipe 13, the vapors treated in column 10, which still contain a certain amount of NO and $NO_2$, with a large predominance of the latter. In the scrubber device 12, these vapors meet a stream of water supplied through pipe 14 and which absorbs the nitrated gas with the formation of nitric acid at about 40 percent, for example. Vapors evacuated from scrubber 12 are passed by pipe 15 through exchanger 9, where they absorb a portion of the calories from the outlet of reactor 7, then through an energy recovery device 16 which causes the said vapors to participate in driving compressor 3, to be finally evacuated to the atmosphere at 17. In column 10, drying by water condensation, oxidation and cooling of nitrous vapors, and absorption thereof by the dilute acid introduced through pipe 11, are carried out in conjunction, which enables the unit to be considerably simplified with respect to what it would be if known processes were used, the one column 10 replacing three apparatus, or at least two.

Nitric acid at 60% $HNO_3$, for instance, formed in column 10, passes at 18 into a denitration device 19 which, as will be described hereinafter, can be integrated with column 10 at the base of the latter, which still further simplifies the unit. In device 19, the acid meets a stream of air supplied through pipe 20 branched from outlet pipe 4 of compressor 3; the air stream strips the dissolved $NO_2$ gas from the acid and supplies the said gas to column 10 through pipe 21, to mix with the nitrous vapors arriving in the said column through pipe 8, the denitrated acid then being sent to storage through pipe 22.

An embodiment of column 10 is shown diagrammatically in FIG. 2. In this example, column 10 comprises a casing 23, constituted in a known manner by superimposed sleeves, in which $n$ contact plates $P_1$, $P_2$-$P_{n-1}$, $P_n$, which can be of any conventional type such as of the perforated valve, bubble type or the like, are arranged one above the other. To simplify the figure, these plates are represented very schematically in the form of a perforated plate, but it should be understood that they comprise the usual means, such as are provided in the types of plate mentioned hereinabove, to ensure intimate contact of the acid which flows through the said plates and the nitrous vapors which pass upwardly through the same. Each plate comprises an acid inlet, overflow cup A ($A_1$, $A_2$-$A_{n-1}$, $A_n$) an acid outlet, overflow cup D ($D_1$, $D_2$-$D_{n-1}$, $D_n$) and a cooling coil S ($S_1$, $S_2$ $S_{n-1}$, $S_n$) in which circulates a cooling fluid, such as water, brine or ammonia. A vertical down-pipe L ($L_1$, $L_2$ $L_{n-1}$, $L_n$) leaves each acid outlet cup $D_1$, $D_2$-$D_n$ and opens, for pipes $L_1$ to $L_{n-1}$, in the acid inlet cup $A_2$, $A_3$-$A_{n-1}$, $A_n$ of the plate immediately below, pipe $L_n$ leaving cup $D_n$ ensures transfer of the acid to the scrubbing device which will be described hereinafter. The acid inlet cup $A_1$ of the top plate P is supplied through acid inlet pipe 11 from scrubber 12 (see FIG. 1).

Plates P are separated from one another by gas-tight partitions C ($C_1$, $C_2$-$C_{n-2}$, $C_{n-1}$) which provide separated spaces below and above each corresponding plate and through which pass, respectively, the corresponding acid down-pipes $L_1$, $L_2$-$L_{na-1}$, pipes $G_1$, $G_2$ $G_{n-1}$ which respectively connect the space above each plate $P_1$, $P_2$ $P_{n-1}$ with that below plate $P_2$, $P_3$-$P_n$ immediately below it, and finally, a chimney Ch which opens in the lower portion of the column through a partition $C_n$ which forms the space beneath plate $P_n$, and at the top portion of the column, through partition $C_1$ beneath plate $P_1$. The nitrous vapor inlet pipe 8 (FIG. 1) opens in the space below partition $C_n$, the said partition $C_n$ also having the acid down-pipe $L_n$ from plate $P_n$ passing therethrough.

In the example, and according to a particularly advantageous embodiment of the invention, the denitration device 19 is combined with column 10, and for this purpose the lower portion thereof contains p superimposed plates $P_{n+1}$-$P_{p-1}$, $P_p$, which can be of the same type as plates $P_1$ to $P_n$, or of any other conventional type, each of said plates $P_{n+1}$-$P_p$ being provided with an acid inlet, overflow cup $A_{n+1}$-$A_{p-1}$, $A_p$ and an acid outlet cup $D_{n+1}$ $D_{p-1}$, $D_p$, the said outlet cup being, for each plate, connected to the acid inlet cup of the plate immediately below it by a down-pipe $L_{n+1}$-$L_{p-1}$, with the exception of cup $D_p$ which is provided with an acid outlet pipe leading into the space at the bottom of the column, beneath plate $P_p$, space into which lead an inlet pipe 20 for providing additional air and a pipe 22 for evacuating acid to storage (see FIG. 1).

The volume formed by the spaces defined by a plate $P_2$-$P_n$ (plate $P_2$ for instance) and partition C beneath the said plate ($C_1$ for instance), and by the plate immediately below ($P_3$ for instance) and partition C which is below the last mentioned plate ($C_3$ for instance), which spaces are connected by the corresponding nitrous vapor down-pipe G ($G_2$ in the example chosen) varies from one plate to the next from the top to the bottom of the column, in the measure described hereinafter. These successive volumes, to which are added each time the inner volume of the corresponding vapor down-pipe G are designated respectively by $V_2$, $V_3$-$V_{n-2}$, $V_{n-1}$. Volume $V_1$ corresponding to plate $P_2$ consists of the space between plate $P_1$ and the top of the column, the space between plate $P_2$ and partition $C_2$, and finally, the volume inside pipe $G_1$.

The condensation and absorption column thus constituted operates as follows:

The nitrous vapors resulting from the catalytic combustion of ammonia, and containing essentially water, NO and $NO_2$ ($N_2O_4$) enter the column at 8 and rise through the central chimney Ch below the top plate $P_1$. During this passage, and during the period of time the gas remains in space $V_o$ beneath plate $P_1$, the said vapors continue to oxidize according to reaction (II) and their $NO_2$ (or $N_2O_4$) content increases accordingly. The said vapors then flow through plate $P_1$ on which they meet the nitric acid at low concentration, about 40 percent fed through pipe 11 from scrubber 12 (FIG. 1). At the same time, the said vapors are cooled by the fluid circulating in coil $S_1$. As a result, a portion of the water contained therein condenses and mixes with the acid, while a $NO_2$ (or $N_2O_4$) fraction is absorbed by the said acid. The vapors, containing less water and $NO_2$, then escape into the space above plate $P_1$ and pass through pipe $G_1$ into the space beneath plate $P_2$. At the same time, the enriched acid flows through down-pipe $L_1$ onto plate $P_2$. During the time they remain in the spaces above plate $P_1$ and below plate $P_2$ (volume $V_1$) the nitrous vapors continue to oxidize and their relative $NO_2$ (or $N_2O_4$) content increases. The steps carried out on plate $P_1$ are repeated on plate $P_2$, the vapors escaping above said plate $P_2$ passing under plate $P_3$ through volume $V_2$ while the enriched acid flowing therefrom flows over plate $P_3$, and so on until plate $P_n$; the vapors, the NO and $NO_2$ contents of which have been reduced to the maximum possible extent, escaping above this last plate $P_n$ leave the column by pipe 13 to be sent to the scrubber 12 (FIG. 1), while the nitric acid at a concentration of about 60% $HNO_3$ flows from said plate $P_n$ by down-pipe $L_n$.

The said acid, in which a certain amount of $NO_2$ is dissolved, then meets the additional air supplied in a counter-current by pipe 20 according to the conventional denitration techniques, on the successive plates $P_{n+1}-P_p$. Said air draws along the dissolved $NO_2$, and, loaded with the latter, mixes with the nitrous vapors reaching the column at 8, thus increasing the amount of $NO_2$ therein. It then participates in the oxidation of NO in the said vapors during their passage through the column. Finally, the acid thus denitrated, which collects in the bottom of the column, is sent to storage through pipe 22.

As has been explained hereinabove, the degree of oxidation of the nitrous vapors is increased as it passes from one plate to another so that, at each stage of contact of these vapors and the acid which descends from plate to plate, the optimal absorption conditions of $NO_2$ by the said acid are obtained, taking into account the various parameters involved, viz: temperatures, pressure of the nitrous vapors and partial pressures of their constituents, concentration of the acid on the next plate. The said degree of oxidation at each step is a function of the volume $V_1$, $V_2-V_{n-1}$ in which oxidation takes place.

The said volumes can be determined by a calculation within the power of anyone skilled in the art.

Taking a gas phase formed of nitrous vapors in equilibrium with a liquid phase formed of a solution of nitric acid, the parameters defining each of the said phases are linked by five mathematical relationships.

The parameters of the gas phase are:
P: total pressure
$f$: partial pressure of NO
$g$: partial pressure of $NO_2$
$h$: 2 x pressure of $N_2O_4$
$a$: concentration of nitrous products in the dissociated gas
$m$: concentration of steam
X: degree of oxidation
T: absolute temperature of the gas (which is also that of the liquid)
The parameters of the liquid phase are:
W: concentration of the acid
T: absolute temperature of the liquid.

The five relations which link these parameters have the following form:

(1) $$m \times P = \Phi(W, T)$$

(2) $$X = \frac{g+h}{f+g+h}$$

(3) $$a = \frac{f+g+h}{P + \frac{g+h}{2}}$$

(4) $$\log(h/g^2) = \psi(T)$$

(5) $$\log(f/h^{3/2}) = \xi(W)$$

$\Phi(W,T)$ is a function deduced from the values given in the table of the partial pressures of steam over nitric acid solutions (International Critical Tables); $\psi(T)$ and $\xi(W)$ are functions the form and coefficients of which have been defined and specified in many prior publications (cf. among others, BODENSTEIN, M. Z. Physik, Chem. 100, 68 (1922), CARBERRY, J.J. Chem. Eng. Sci. 9, 189 (1959)).

By determining four of the nine parameters, the system is perfectly defined. In practice, the two parameters $a$ concentration of nitrous products and $m$ concentration of steam, are imposed. The oxidation parameter $X$ can be selected arbitrarily, without any major complication, within a limit of 0.40 to 0.90. The pressure parameter (P) is *a priori* completely free, within the above mentioned provisions relating to the actual practical possibilities.

The above four parameters being settled, the resolution of the system gives the values of the other parameters.

The characteristics of the gas phase and the liquid phase at dew-point are thus defined.

If the temperature of the entire system is lowered condensation and absorption take place.

Starting with equation III given at the beginning of this specification, it is possible to calculate, by successive approximations, the strength of the acid on a given plate and the characteristics of the gas leaving the same plate for a determined evacuation of calories from the said plate.

Finally, knowing that the oxidation rate of the gas develops with time $\theta$ in accordance with the classical equation:
$$\theta = \Omega(a, P, T, X, C)$$
function $\Omega$ in which C characterizes the oxygen content of the gas being also defined in the above-mentioned prior literature (BODENSTEIN, M. Z. Physik. Chem. 100, 68 (1922)), it is possible to determine the oxidation rate of the gas entering below the next plate as a function of the "height between the plates" and the actual rate of gas flow.

By a new series of successive approximations, it is possible to determine the spacing permitting operational characteristics of the said next plate, such that the increase in the strength of the acid on the said plate follows a pre-imposed law and yet compatible with the evacuation of the calories produced.

Determination of the dimensions of the volumes within column 10 is thus carried out step by step. It should, however, be noted that the law of variation of the strength of the acid from one plate to another cannot be selected quite arbitrarily and can only be determined by successive corrections, taking into account the physical or technical impossibilities met with during calculation.

For a given pressure, there exists an infinity of solutions to choose from, taking local economical conditions into account (cost of the sleeves per meter, cost of a plate etc.).

It should also be noted that the five equations given hereinabove do not take into account certain phenomena, the main ones being the dissolving of nitrous products in nitric acid and the advance in steam condensation. The dissolving, which necessitates denitration of the acid, after which a portion of the nitrous gases are recycled, can moreover be foreseen and the necessary corrections can also be applied, taking into account the increase of the partial pressure of the nitrous products resulting from said recycling. It is the same with the advance in steam condensation which can be calculated to lower the temperature of the first plate to below the critical temperature of corrosion.

It should be noted that through lowering the temperature of the last plate (and even of a few preceeding plates) by using as circulating fluid in the corresponding coils S the liquid ammonia which constitutes the starting material for the production of nitrous vapors, it should be possible to dissolve a substantial part of the nitrous products which are not absorbed during condensation, whereby the size of scrubber 12 used after column 10 can be considerably reduced.

Furthermore, by proceeding in this manner, a large amount of the nitrous products will be recycled and brought back to the head of condensor 10 with the excess air which has been used for denitration as usual, and operation of the condensor will be improved owing to the increase in the partial pressure of the nitrous products in the part of the condensor where the high temperature restrains the speed of reoxidation.

As an example, tables B, C and D hereinbelow give the various values relating to the composition of the gases, the concentration and temperature of the acid arriving on each plate, the amount of acid produced on each plate and the "height H between plates," as well as the same values relating to the gases and the acid leaving the last plate, by pipes 13 and 22 respectively, and the total height, for columns with 12, 16 and 12 condensation-absorption plates ($n = 12$ 16 and 12 respectively), in the case of respective operations at 88, 59 and 117.5 p.s.i., operation at 59 p.s.i. being the most advantageous as it gives a column of acceptable height, taking the denitration device into account, without the risk of corroding the conventional stainless steel used to make the column, and consequently is the subject of table B.

In all three cases, the temperature of the nitrous vapors entering the column by pipe 8, at the outlet of exchanger 9 (FIG. 1) is about 150° C. The fluid circulating in the coils S is water at a temperature of 20° C. at the inlet to each coil, or liquid ammonia which vaporizes at the temperature corresponding to the pressure of the system. The velocity of the gases between plates is about 0.20 m/sec.

TABLE B
Pressure: 88 p.s.i.

| | Gas arriving at plate $n$ | | | | Acid arriving at plate $n$ | | |
|---|---|---|---|---|---|---|---|
| $n$ | Percent NO plus $NO_2$ | Percent $H_2O$ | $h^1$ (m) | Time gas remains | Percent $HNO_3$ | Temp., °C. | Quantity of acid produced, percent |
| 1 | 8.56 | 14.5 | | | 40.7 | 30 | 19. |
| 2 | 8.44 | 13.3 | 0.40 | 2.0 | 40.7 | 100.5 | 23.6 |
| 3 | 7.86 | 9.6 | 0.48 | 2.4 | 43.1 | 99 | 35.3 |
| 4 | 7.16 | 6.5 | 0.60 | 3.0 | 45.5 | 89.5 | 47.0 |
| 5 | 6.44 | 4.3 | 0.60 | 3.0 | 47.9 | 80.5 | 57.2 |
| 6 | 5.57 | 2.1 | 0.76 | 3.8 | 50.3 | 65.0 | 68.3 |
| 7 | 4.87 | 1.3 | 1.40 | 7.0 | 52.6 | 55.5 | 76.3 |
| 8 | 4.25 | 0.9 | 2.02 | 10.1 | 54.6 | 49.0 | 82.9 |
| 9 | 3.76 | 0.6 | 3.32 | 16.6 | 56.1 | 43.5 | 88.1 |
| 10 | 3.36 | 0.5 | 3.60 | 18.0 | 57.3 | 39.5 | 92.3 |
| 11 | 3.03 | 0.35 | 3.28 | 16.4 | 58.2 | 33.5 | 95.6 |
| 12 | 2.79 | 0.3 | 4.06 | 20.3 | 58.9 | 30.5 | 98.0 |
| Gas leaving the last plate $H^3$ (M) | | | | | Acid leaving the last plate | | |
| | $^4$2.21 | 0.25 | 20.52 | | 59.4 | 27.5 | 100 |

$^1$ h=height in $m$ between plates $n$ and $n+1$.
$^2$ Time the gas remains between plates $n$ and $n+1$.
$^3$ H=total height.
$^4$ After deducting the $NO_2$ dissolved in the acid.

TABLE C
Pressure: 59 p.s.i.

| | Gas arriving at plate $n$ | | | | Acid arriving at plate $n$ | | |
|---|---|---|---|---|---|---|---|
| $n$ | Percent NO plus $NO_2$ | Percent $H_2O$ | $h^1$ (m) | Time it remains | Percent $HNO_3$ | Temp., °C. | Amount of acid product, percent |
| 1 | 8.56 | 14.5 | | | 40.6 | 30 | 20.3 |
| 2 | 8.44 | 13.3 | 0.48 | 2.4 | 40.6 | 95 | 23.5 |
| 3 | 7.77 | 8.2 | 0.38 | 1.9 | 42.4 | 83 | 37.9 |
| 4 | 7.02 | 4.65 | 0.30 | 1.5 | 44.7 | 71 | 50.0 |
| 5 | 6.33 | 2.6 | 0.36 | 1.8 | 47.0 | 59 | 59.5 |
| 6 | 5.68 | 1.5 | 0.50 | 2.5 | 49.3 | 49.5 | 67.2 |
| 7 | 5.13 | 1.1 | 0.94 | 4.7 | 51.3 | 43 | 73.3 |
| 8 | 4.64 | 0.9 | 2.17 | 10.85 | 53.1 | 40.5 | 78.6 |
| 9 | 4.15 | 0.7 | 2.98 | 14.9 | 54.8 | 38 | 83.8 |
| 10 | 3.77 | 0.6 | 3.64 | 18.2 | 56.0 | 35.5 | 87.7 |
| 11 | 3.47 | 0.5 | 3.08 | 15.4 | 59.9 | 32.5 | 90.8 |
| 12 | 3.26 | 0.4 | 4.60 | 23.0 | 57.5 | 30 | 92.9 |
| 13 | 3.05 | 0.35 | 3.27 | 16.35 | 58.1 | 27.5 | 95.1 |
| 14 | 2.90 | 0.3 | 2.24 | 11.2 | 58.5 | 25 | 96.5 |
| 15 | 2.78 | 0.25 | 2.64 | 13.2 | 58.8 | 21 | 97.8 |
| 16 | 2.67 | 0.2 | 3.20 | 16.0 | 59.1 | 19 | 98.9 |
| Gas leaving the last plate H(m) | | | | | Acid leaving the last plate | | |
| | 2.17 | 0.2 | 30.78 | | 59.4 | 17 | 100 |

$^1$ See footnote to Table B.

TABLE D
Pressure: 8 absolute atmospheres

| | Gas arriving at plate $n$ | | | | Acid arriving at plate $n$ | | |
|---|---|---|---|---|---|---|---|
| $n$ | Percent NO plus $NO_2$ | Percent $H_2O$ | h(¹)(m) | Time it remains | Percent $HNO_3$ | Temp., °C. | Amount of acid produced, percent |
| 1 | 8.56 | 14.5 | | | 40.7 | 30 | 20.4 |
| 2 | 8.44 | 13.3 | 0.28 | 1.4 | 40.7 | 115 | 23.5 |
| 3 | 7.87 | 9.9 | 0.38 | 1.9 | 43.3 | 108 | 34.8 |
| 4 | 7.15 | 6.7 | 0.46 | 2.3 | 45.8 | 98 | 46.8 |
| 5 | 6.42 | 4.4 | 0.48 | 2.4 | 48.2 | 88.5 | 57.1 |
| 6 | 5.55 | 2.3 | 0.64 | 3.2 | 50.6 | 73.5 | 68.2 |
| 7 | 4.84 | 1.4 | 1.26 | 6.3 | 52.9 | 64 | 76.3 |
| 8 | 4.21 | 1.0 | 1.98 | 9.9 | 54.9 | 57.5 | 83.0 |
| 9 | 3.71 | 0.7 | 2.42 | 12.1 | 56.4 | 52 | 88.3 |
| 10 | 3.33 | 0.55 | 1.84 | 9.2 | 57.5 | 47 | 92.2 |
| 11 | 3.02 | 0.35 | 1.56 | 7.8 | 58.3 | 40 | 95.4 |
| 12 | 2.77 | 0.25 | 1.48 | 7.4 | 58.9 | 34 | 97.9 |
| Gas leaving the last plate H(m) | | | | | Acid leaving the last plate | | |
| | 2.18 | 0.2 | 12.78 | | 59.5 | 28 | 100 |

See footnote to Table B.

It is seen that the time the product remains in the system, therefor the volume and total height, and consequently the cost of the apparatus, increase considerably when pressure decreases. Furthermore, the temperature of the first plate increases with the pressure and reaches 115° C for 117.5 p.s.i. As hereinabove stated, this temperature is approximately the limit at which risk of corroding the apparatus starts, except if special steels which have a greater resistance to corrosion than conventional stainless steels are used, which also increases the cost. It is, therefore, advantageous to operate at between 59 and 117.5 p.s.i., a pressure of about 88 p.s.i. being that which enables the best operating conditions to be combined with an acceptable cost of the apparatus.

It will be understood that various modifications may be brought to the manner of operating the condensation and absorption apparatus as described hereinabove by way of example. Acid solutions, supplied from the scrubber for instance, may be introduced into one or more intermediary plates, in addition to being introduced onto the first plate. Additional air, containing nitrous products or not, and supplied from the denitrator for instance, can also be introduced between any two plates. If desired, a portion of the acid product can be drawn off from one or more intermediate plates. Of course, all such modifications should be taken into account in calculating the characteristics of the apparatus, but this can be carried out without excessive difficulty.

As can be seen, the method according to the invention, by permitting the four steps of cooling, drying, oxidation and absorption of nitrous vapors to be carried out in a single apparatus, results in considerable simplification of the installation for the production of nitric acid from the products of the catalytic combustion of ammonia. More particularly, the number and length of the pipes connecting the various apparatus are greatly decreased and there is no necessity to carry out intermediate compression of the nitrous vapors, thus making the process very much more economical. The acid evacuated from the scrubbing column is at least as strong as about 40 percent, at which strength a high partial pressure of nitrous products is not necessary.

This saving on piping can be carried still further if, when space permits, the device for scrubbing the vapors evacuated from the nitrous vapor condensation-absorption apparatus is integrated with the latter by placing the said device on the top of said apparatus. The dilute nitric acid produced in the scrubber flows directly onto the first plate of the column.

In order to check the operation of the method according to the invention on a commercial scale, trials have been carried out in a column built according to the principle of FIG. 2 and having the following characteristics:

| | |
|---|---|
| Inner diameter | 1,600 mm |
| Cylindrical height | 11,690 mm |
| Number of plates: | 9 |

Said column received gas under pressure (44 p.s.i.) containing about 9% nitrous products, 15.5 percent steam, 6.5 percent oxygen and 69 percent inert gases. The average velocity of gases in the column was 0.20 m/sec and the temperature of the cooling fluid 6° C.

The following operation parameters were found:

TABLE E

| Plate outlet N° | Temperature of acid °C. | Strength of acid %HNO$_3$ | |
|---|---|---|---|
| | | Found | Calculated |
| 1 | 64 | 38.5 | 41 |
| 2 | 47 | 46 | 46.5 |
| 3 | 38 | 48.5 | 50.0 |
| 4 | 34 | 50.5 | 52.4 |
| 5 | 26.5 | 53 | 54.4 |
| 6 | 19 | 55.5 | 56.1 |
| 7 | 17.5 | 56.5 | 57.2 |
| 8 | 13 | 58 | 58.1 |
| 9 | 12 | 58.5 | 58.8 |

The parameters found agreed with the results of the calculations as described hereinabove. It should also be noted that, under the operating conditions of the trials, the phenomena of nitrous products dissolving and advance in steam condensation substantially compensate each other, so that it was unnecessary to take them into account in the mathematical expression.

Other modifications can also be brought to the invention as hereinabove described by anyone skilled in the art without departing from the scope of the following claims.

What we claim is
1. A method for the manufacture of nitric acid having a predetermined relatively high concentration consisting essentially of the steps of (1) continuously intimately contacting a gaseous mixture containing a high content of NO, NO$_2$, oxygen and water vapor resulting from the catalytic oxidation of ammonia in the presence of excess air, said gaseous mixture having a ratio of NO$_2$/NO+NO$_2$ of at least 0.4 at a pressure of between about 59 to 117.5 p.s.i. with a nitric acid solution having a relatively low concentration lower than that of a nitric acid solution which under the prevailing conditions would be in equilibrium with the oxides of nitrogen in said gaseous mixture, with simultaneous cooling of said nitric acid solution whereby a gaseous mixture having a lower temperature and a lower content of NO$_2$ and water vapor and a higher content of NO and a nitric acid solution having a higher concentration are continuously obtained respectively, (2) continuously passing said gaseous mixture having a higher content of NO through a free space within which oxidation of NO to NO$_2$ takes place, (3) continuously intimately contacting said gaseous mixture after passage through said free space with said nitric acid solution having a higher concentration, with simultaneous cooling of said nitric acid solution whereby the gaseous mixture after contacting said nitric acid solution has a lower content of NO$_2$ and water vapor and the nitric acid concentration is further increased, and (4) repeating said steps (2) and (3) until a nitric acid solution having said predetermined, relatively high concentration is obtained and the NO$_2$ and NO concentration is reduced, each of the odd numbered steps being operated at a progressively lower temperature, and (5) recovering said nitric acid solution having said pre-determined, relatively high concentration.

2. A method as claimed in claim 1, wherein said pressure is of about 88 p.s.i.

* * * * *